United States Patent [19]

Pöllmann et al.

[11] Patent Number: 5,718,834
[45] Date of Patent: Feb. 17, 1998

[54] POLYMER-THICKENED DEICING COMPOSITION AND ANTI-ICING COMPOSITION FOR AIRCRAFT

[76] Inventors: Klaus Pöllmann, Enk-Strasse 7, D-84489 Burghausen; Josef Kapfinger, Arnstorfer Strasse 7, D-84326 Falkenberg, both of Germany

[21] Appl. No.: 730,968

[22] Filed: Oct. 16, 1996

[30] Foreign Application Priority Data

Oct. 18, 1995 [DE] Germany .................. 195 38 607.8

[51] Int. Cl.⁶ ........................................... C09K 3/18
[52] U.S. Cl. ................................. 252/70; 106/13
[58] Field of Search ......................... 252/70; 106/13

[56] References Cited

U.S. PATENT DOCUMENTS

| | | | |
|---|---|---|---|
| 4,358,389 | 11/1982 | König-Lumer et al. | 252/70 |
| 4,744,913 | 5/1988 | Salvador et al. | 252/70 |
| 4,954,279 | 9/1990 | Ma et al. | 252/70 |
| 5,118,434 | 6/1992 | Meyer et al. | 252/70 |
| 5,118,435 | 6/1992 | Nieh | 252/70 |
| 5,268,116 | 12/1993 | Fusiak et al. | 252/70 |
| 5,273,673 | 12/1993 | Ashrawi et al. | 252/70 |
| 5,334,323 | 8/1994 | Schrimpf et al. | 252/70 |
| 5,389,276 | 2/1995 | Coffey et al. | 252/70 |

FOREIGN PATENT DOCUMENTS

| | | |
|---|---|---|
| 0 678 565 | 10/1995 | European Pat. Off. |
| 2423893 | 12/1975 | Germany. |
| 92551 | 9/1987 | Romania. |

OTHER PUBLICATIONS

Constantin, A., et al, *Chem. Abs.* 108:223487p (Sep. 1987).

*Primary Examiner*—Anthony J. Green
*Attorney, Agent, or Firm*—Connolly & Hutz

[57] ABSTRACT

The composition described includes as thickener water-soluble crosslinked acrylic homopolymers having a mean molecular weight of from 750,000 to 1,250,900 and a viscosity, in the form of a 0.5% strength by weight aqueous solution with a pH of 7.0 and a temperature of 20° C., of from 1000 to 13,000 mPa·s, measured with a Brookfield viscometer at 20 rpm, and in addition thereto from 0.02 to 1.5% by weight of at least one nonionic surfactant formed from an alcohol having 6 to 22 carbon atoms which is reacted with from 1 to 10 molecules of a low molecular mass alkylene oxide, and from 0.03 to 1% by weight of at least one water-soluble salt compound of an inorganic acid or a carboxylic acid or a mixture thereof. The deicing liquid described is notable for a long holdover time and good flowoff behavior.

11 Claims, No Drawings

POLYMER-THICKENED DEICING COMPOSITION AND ANTI-ICING COMPOSITION FOR AIRCRAFT

DESCRIPTION

The invention relates to a deicing and anti-icing composition for aircraft which is based on glycols and water and contains water-soluble crosslinked acrylic polymers as thickener.

Deicing and anti-icing compositions for aircraft (referred to below for the sake of brevity simply as deicing compositions or deicing liquids) are employed to remove ice, snow and/or hoar frost from the surfaces of aircraft and to avoid such deposits on these areas. The period of time over which the deicing liquid provides protection against the re-formation of ice, snow and/or hoar frost on the aircraft is termed the reicing protection time or holdover time. The "Recommendations for De-/Anti-Icing of Aircraft on the Ground" (March 1993 edition) of the Association of European Airlines (AEA) and the International Standardisation Organisation (ISO) Specifications 11075, 11076 and 11078 specify unthickened (type I) and thickened (type II) aircraft deicing liquids. The thickener in type II liquids gives them a pseudoplastic consistency (non-Newtonian rheology).

Particular expectations of type II aircraft deicing compositions are that they should provide as long as possible a term of protection against reicing of the wings prior to takeoff under extreme weather conditions, such as snowfall or freezing rain, and good flowoff from the aircraft on takeoff. Thus the ISO Standard 11078, which came into force in 1993, requires a reicing protection time of at least 30 minutes at −5° C. in the "water spray endurance test" [the deicing liquid is subjected beforehand for 5 minutes to a shear stress of 3500 revolutions per minute (rpm)]. In accordance with the most recent requirements of some airlines, the reicing protection time should in fact be markedly above the stated 30 minutes, coupled with the best possible flowoff behavior. The flowoff behavior is, in principle, better the lower the viscosity of the deicing liquid at the prevailing external temperature.

It is not difficult to obtain the required values for one of the two properties (holdover time and flowoff behavior) without taking into account the other. For instance, a long reicing protection time can be obtained readily with a thickener of particularly high molecular mass. The resulting, highly viscous film remains unchanged for a long time on the aircraft at rest and ensures the long holdover time aimed for. However, because of its high viscosity at rest and yield value, the film will not flow off quickly enough when the aircraft takes off. Good flowoff behavior is shown by liquids which form a relatively low-viscosity film. Since such films tend to be unstable and separate after only a short time, they are unable to afford the required protection against reicing. The two properties, holdover time and flowoff behavior, are therefore in conflict with one another.

Numerous experiments have already been undertaken in order to provide thickened deicing liquids with long protection against reicing and with good flowoff behavior. For instance, the two properties are intended to be obtained in accordance with U.S. Pat. No. 5,118,435 when the thickener employed is a blend of an acrylic homopolymer having a mean molecular weight of from about 2,500,000 to about 3,500,000 and an acrylic copolymer, and, in accordance with U.S. Pat. No. 5,273,673, when the deicing liquid comprises the said thickener mixture and, additionally, a nonionic surfactant from the group consisting of alkylphenolethoxylates and an anionic surfactant from the group consisting of alkylarylsulfonates.

According to U.S. Pat. No. 5,334,323 (EP-A-360 183) the sought-after properties are obtained, in the case of thickened aircraft deicing liquids based on glycols and water, if crosslinked polyacrylic acid alone is employed and, additionally, a nonionic surfactant from the group consisting of alkoxylated higher alcohols, and the pH of the liquid is adjusted using sodium hydroxide or sodium hydroxide and potassium hydroxide in a specific ratio to one another. Possible acrylic acid homopolymers mentioned are, admittedly, all those having a viscosity of from 5000 to 60,000 mPa·s at 20° C. and at a pH of 7.0 in the form of a 0.5% strength by weight aqueous solution, measured with a Brookfield viscometer at 20 rpm. The only specific example given, however, and recommended is ®CARBOPOL 934 from B.F. Goodrich Chemical GmbH, Germany. As shown by the brochure GC-67 dating from 1984 (German translation) from B.F. Goodrich Chemical GmbH regarding its carbopol products (compare Table 1 on page 3 and pages 20 and 43), ®CARBOPOL 934 has a molecular weight of about 3,000,000 and a viscosity, in the form of the said 0.5% strength by weight aqueous solution, of from about 30,500 to 39,400 mPa·s. Therefore, the acrylic acid homopolymer used in U.S. Pat. No. 5,334,323 (like that recommended in the two first-mentioned U.S. Patents) is of high-molecular mass and high viscosity.

Mention may also be made of Chemical Abstracts 108: 223487p (1988) of the Romanian Patent RO 92,551. This describes aircraft deicing compositions which form films of high shear resistance and consist of propylene glycol, polyacrylamide, sodium biphosphate or borax, ethoxylated nonylphenol or ethoxylated oleyl alcohol with a degree of ethoxylation of 17, and water in a quantity which is defined in each case.

The stated prior art therefore imparts the teaching that in order to achieve the desired properties it is necessary to employ acrylic homopolymers with high molecular weight (from about 2,500,000 to 3,500,000) and high viscosity (from about 30,000 to 40,000 mPa·s).

It has now been found that thickened aircraft deicing liquids based on glycols and water, having a long hold-over time and good flowoff behavior, are obtained when an acrylic homopolymer or a mixture of acrylic homopolymers having a relatively low molecular weight and a relatively low viscosity is employed in combination with an alkoxylated higher alcohol and a water-soluble salt compound, so that there is a certain concentration of salt in the liquid. This is an entirely unexpected result. The threefold combination according to the invention, consisting of the said thickener of moderate molecular mass and moderate viscosity, the said nonionic surfactant and the said salt compound, evidently has a synergistic effect resulting in the deicing liquid with viscosity characteristics which provide both a long holdover time and good flowoff behavior.

The novel polymer-thickened deicing composition and anti-icing composition essentially consists of a) from 35 to 70% by weight, preferably from 40 to 60% by weight, of at least one alkylene glycol having 2 to 3 carbon atoms or oxalkylene glycol having 4 to 6 carbon atoms, or a mixture thereof, b) from 0.05 to 1.5% by weight, preferably from 0.1 to 1% by weight, of a water-soluble crosslinked homopolymer of acrylic acid or methacrylic acid, or of a mixture of such homopolymers, the homopolymer and the mixture each having a mean molecular weight of from 750,000 to 1,250,000 and a viscosity, each in the form of a 0.5% strength by weight aqueous solution with a pH of 7.0 and a temperature of 20° C., of from 1000 to 13,000 mPa·s, measured with a Brookfield viscometer at 20 rpm, c) from 0.02 to 1.5% by weight, preferably from 0.05 to 1% by weight, of at least one nonionic surfactant formed from an alcohol having 6 to 22 carbon atoms, preferably 8 to 18 carbon atoms, which is reacted with from 1 to 10 molecules of a low molecular mass alkylene oxide, d) from 0.03 to 1% by weight, preferably from 0.05 to 0.4% by weight, of at least one water-soluble salt compound of an inorganic acid or a carboxylic acid or a mixture thereof, e) from 0.01 to 1% by weight, preferably from 0.03 to 0.7% by weight, of at least one imidazole compound or a triazole compound or a mixture thereof as corrosion inhibitor, and f) water as remainder to 100% by weight, percentages by weight being based on the composition.

Component a) is preferably ethylene glycol, propylene glycol (1,2-propylene glycol or 1,3-propylene glycol), diethylene glycol, dipropylene glycol or a mixture of two or more of these glycols, propylene glycol being particularly preferred. The glycols serve above all to lower the freezing point and, in addition to water, constitute the principal component of the liquid.

Component b) is a water-soluble crosslinked acrylic acid homopolymer or a water-soluble crosslinked methacrylic acid homopolymer of a defined molecular weight, namely from 750,000 to 1,250,000, and with a defined viscosity, namely from 1000 to 13,000 mPa·s, preferably from 2000 to 7000 mPa·s, measured with a Brookfield viscometer at 20 rpm on a 0.5% strength by weight aqueous solution (of the polymer) having a pH of 7.0 (adjusted with NaOH) and a temperature of 20° C. Component b) can also be a mixture of water-soluble crosslinked acrylic acid homopolymers and/or water-soluble crosslinked methacrylic acid homopolymers, provided the mixtures in the form of the said solution have the said viscosity of from 1000 to 13,000 mPa·s, preferably from 2000 to 7000 mPa·s, and a mean molecular weight of from 750,000 to 1,250,000.

Component b) is preferably an acrylic acid or methacrylic acid homopolymer which alone has the stated values of molecular weight and viscosity. It is self-evident that the crosslinked homopolymer of acrylic acid or methacrylic acid can also be employed in the form of the corresponding acrylates, preferably alkali metal acrylates (the alkali metal is preferably potassium or sodium). The abovementioned water-solubility of the acrylic homopolymer is present when a clear solution is obtained on dissolving up to 10 g of acrylic homopolymer in 1000 g of water at about 20° C. after adjustment to a pH of 7 with an alkali metal hydroxide. Crosslinked acrylic acid or methacrylic acid homopolymers and their alkali metal salts which are suitable in accordance with the invention are available commercially, for example under the designation ®CARBOPOL from B.F. Goodrich Chemical GmbH, Germany. The term homopolymer of acrylic acid or methacrylic acid and acrylic acid or methacrylic acid homopolymer refers inclusively to those acrylic polymers which (in addition to acrylic acid or methacrylic acid) include up to 5 mol-%, preferably up to 3 mol-%, of comonomer units (in the polymer) of a comonomer from the group consisting of $C_6$–$C_{22}$-alkyl acrylates and $C_6$–$C_{22}$-alkyl methacrylates. The (saturated) alkyl group, which preferably has from 8 to 18 carbon atoms, can be straight or branched, straight being preferred. Examples of such comonomers are n-octyl acrylate, n-decyl acrylate, lauryl acrylate, myristyl acrylate and stearyl acrylate and the corresponding methacrylates.

Component c) is a nonionic surfactant, preferably from the group consisting of fatty alcohol alkoxylates containing 1 to 10 molecules (units), preferably 1 to 5 molecules, of a low molecular mass alkylene oxide. Preferred alkylene oxides are ethylene oxide or propylene oxide, ethylene oxide being particularly preferred. The alkyl radical in the fatty alcohol generally contains 6 to 22 carbon atoms, preferably 8 to 18 carbon atoms, and can be straight or branched, straight being preferred, and can be saturated or unsaturated, having preferably 1 to 3 double bonds. Examples which may be mentioned are octyl, decyl, dodecyl, isotridecyl and stearyl alcohol, and also oleyl, cocoalkyl and tallowalkyl alcohol, and also a fatty alcohol mixture with a $C_{12}$-alkyl radical and $C_{14}$-alkyl radical ($C_{12}/C_{14}$ fatty alcohol) which is ethoxylated with from 1 to 10 mol, preferably from 1 to 5 mol, of ethylene oxide. Other surfactants, such as anionic compounds from the group of the alkylarylsulfonates, are excluded.

Component d) is a water-soluble salt of an inorganic acid, a salt of an aliphatic or aromatic carboxylic acid, i.e. mono-, di- or polycarboxylic acid, or a mixture of such salts. The inorganic acids are preferably boric acids, hydrohalic acids, silicic acids, phosphoric acids, sulfuric acids and nitric acid. Aliphatic and aromatic carboxylic acids are preferably the $C_1$–$C_3$-monocarboxylic acids, such as formic acid and acetic acid, dicarboxylic acids, such as oxalic acid, hydroxycarboxylic acids, such as lactic acid and citric acid, and the benzoic acid. The water-soluble salt compounds are generally alkali metal salts or alkaline earth metal salts, the alkali metal salts of sodium or potassium being preferred. It is self-evident that in order to obtain the stated salt compound in the deicing liquid it is possible to employ just the corresponding acid if the liquid already includes, for example, sodium ions or potassium ions. The recommended salt compounds are of low molecular mass and are non-surfactant; in other words, they are not surface-active, and therefore have no influence on the surface tension of the glycol/water mixture. Specific examples of suitable salts of inorganic and organic acids which may be mentioned are the sodium or potassium salts of boric acid, phosphoric acid or phosphorous acid, sulfuric acid, nitric acid, formic acid, acetic acid, oxalic acid, lactic acid and citric acid.

Component e) is an imidazole such as 1H-imidazole, methylimidazole and benzimidazole, or a triazole such as benzotriazole and tolyltriazole, or a mixture of the said imidazoles and/or triazoles. The said triazoles are particularly preferred corrosion inhibitors.

Component f) is preferably fully deionized water. The pH of the novel liquid is from 7 to 11, preferably from 7 to 9. Where this pH is not already present, the pH is adjusted with the aid of, preferably, alkali metal hydroxides such as sodium hydroxide and/or potassium hydroxide. Other basic compounds can also be employed for adjusting the pH, for example alkylamines such as butylamine, hexylamine, octylamine or isononylamine, and/or alkanolamines such as mono-, di- or triethanolamine.

The novel deicing liquid is produced by mixing individual components together in any desired sequence, a procedure which can be carried out, for example, in a container fitted with a stirrer at room temperature (from 15° to 30° C).

The novel type II deicing liquid easily meets the requirements mentioned at the outset. Even if the deicing liquid has a high viscosity at rest, which ensures a long holdover time, good flowoff behavior is achieved with the specifically employed salt compound in combination with the specific thickener and nonionic surfactant. The novel combination resolves the conflict between the two properties of holdover time and flowoff behavior. This surprising result apparently stems from an unexpected synergy between the low to medium molecular mass thickener, nonionic surfactant and salt. Their mutual influence leads both to a long reicing protection time and to a marked decrease in viscosity with increasing shear, and therefore to the required flowoff behavior.

The invention is illustrated in more detail by way of the examples according to the invention and comparison examples which follow.

To enable comparison of the action of acrylic acid homopolymers of different molecular weight with regard to holdover time and flowoff behavior, the quantity of thickener employed in the examples according to the invention and in the associated comparison examples was in each case such that the two deicing liquids had the same basic viscosity, i.e. the viscosity at 20° C. and 0.3 rpm. For example, comparing the novel Example 1 and the Comparison Example 1, the substantially longer holdover time in the case of the novel Example 1 is evident, especially since the viscosity values at and −10° C. are substantially lower than in the case of Comparison Example 1. This is a completely unexpected result. Therefore, in comparison with the deicing liquid of the comparison example and despite its lower viscosity, the deicing liquid of Example 1 has a longer holdover time and, owing to the low viscosity, good flowoff behavior.

EXAMPLE 1

A type II aircraft deicing liquid having the following composition was prepared in accordance with the procedure below:

50.00% by weight of 1,2-propylene glycol 0.17% by weight of crosslinked acrylic acid homopolymer having a mean molecular weight of around 1,250,000 and a viscosity of 6050 mPa·s in a 0.5% strength by weight aqueous solution having a pH of 7.0 (adjusted with NaOH), measured with a Brookfield viscometer at 20 rpm and 20° C.

0.10% by weight of fatty alcohol ethoxylate of a $C_{12}$ alcohol and 2 mol of ethylene oxide 0.10% by weight of sodium nitrate 0.05% by weight of benzotriazole remainder: water to 100% by weight.

The homopolymer and also benzotriazole, the surfactant and the sodium nitrate are dissolved with stirring in water at 20° C. The 1,2-propylene glycol is then added and the mixture is adjusted to a pH of 7.2 using sodium hydroxide.

The resulting deicing liquid is tested for viscosity and holdover time. The results are compiled below:

holdover time (in accordance with the water spray endurance test at −5° C.): 52 minutes viscosity at +20° C., 0° C. and −10° C., in each case at 0.3 rpm (0.084 s$^{-1}$ shear rate) and 30 rpm (8.4 s$^{-1}$):

| Temperature [°C.] | Viscosity [mPa · s] | |
|---|---|---|
| | 0.3 rpm | 30 rpm |
| +20 | 6000 | 480 |
| 0 | 6400 | 670 |
| −10 | 5000 | 810 |

COMPARISON EXAMPLE

A type II aircraft deicing liquid having the following composition was prepared in accordance with the procedure below:

50.00% by weight of 1,2-propylene glycol 0.30% by weight of crosslinked acrylic acid homopolymer having a mean molecular weight of around 3,000,000 and a viscosity of 23,750 mPa·s in a 0.5% strength by weight aqueous solution having a pH of 7.0 (adjusted with NaOH), measured with a Brookfield viscometer at 20 rpm and 20° C.

0.10% by weight of fatty alcohol ethoxylate of a $C_{12}$ alcohol and 2 mol of ethylene oxide 0.10% by weight of sodium nitrate 0.05% by weight of benzotriazole remainder: water to 100% by weight.

The homopolymer and also benzotriazole, the surfactant and the sodium nitrate are dissolved with stirring in water at 20° C. The 1,2-propylene glycol is then added and the mixture is adjusted to a pH of 7.2 using sodium hydroxide.

The resulting deicing liquid is tested for viscosity and holdover time. The results are compiled below:

holdover time (in accordance with the water spray endurance test at −5° C.): 43 minutes viscosity at +20° C., 0° C. and −10° C., in each case at 0.3 rpm (0.084 s$^{-1}$ shear rate) and 30 rpm (8.4 s$^{-1}$):

| Temperature [°C.] | Viscosity [mPa · s] | |
|---|---|---|
| | 0.3 rpm | 30 rpm |
| +20 | 6000 | 620 |
| 0 | 10,800 | 1120 |
| −10 | 12,400 | 1490 |

EXAMPLE 2

A type II aircraft deicing liquid having the following composition was prepared in accordance with the procedure below:

50.00% by weight of 1,2-propylene glycol 0.20% by weight of crosslinked acrylic acid homopolymer having a mean molecular weight of around 750,000 and a viscosity of 3000 mPa·s in a 0.5% strength by weight aqueous solution having a pH of 7.0 (adjusted with NaOH), measured with a Brookfield viscometer at 20 rpm and 20° C.

0.10% by weight of fatty alcohol ethoxylate of a alcohol and 2 mol of ethylene oxide 0.05% by weight of sodium sulfate 0.05% by weight of benzotriazole remainder: water to 100% by weight.

Preparation is as described in Example 1.

The resulting deicing liquid is tested for viscosity and holdover time. The results are compiled below:

holdover time (in accordance with the water spray endurance test at −5° C.): 55 minutes viscosity at +20° C., 0° C. and −10° C., in each case at 0.3 rpm (0.084 s$^{-1}$ shear rate) and 30 rpm (8.4 s$^{-1}$):

| Temperature [°C.] | Viscosity [mPa · s] | |
|---|---|---|
| | 0.3 rpm | 30 rpm |
| +20 | 6000 | 370 |
| 0 | 1800 | 360 |
| −10 | 2400 | 640 |

EXAMPLE 3

A type II aircraft deicing liquid having the following composition was prepared in accordance with the procedure below:

50.00% by weight of 1,2-propylene glycol 0.13% by weight of crosslinked acrylic acid homopolymer having a mean molecular weight of around 1,250,000 and a viscosity of 4400 mPa·s in a 0.5% strength by weight aqueous solution having a pH of 7.0 (adjusted with NaOH), measured with a Brookfield viscometer at 20 rpm and 20° C.

0.10% by weight of fatty alcohol ethoxylate of a C$_{14}$ alcohol and 4 mol of ethylene oxide 0.08% by weight of sodium dihydrogen phosphate 0.05% by weight of benzotriazole remainder: water to 100% by weight.

Preparation is as described in Example 1.

The resulting deicing liquid is tested for viscosity and holdover time. The results are compiled below:

holdover time (in accordance with the water spray endurance test at −5° C.): 49 minutes viscosity at +20° C., 0° C. and −10° C., in each case at 0.3 rpm (0.084 s$^{-1}$ shear rate) and 30 rpm (8.4 s$^{-1}$):

| Temperature [°C.] | Viscosity [mPa · s] | |
|---|---|---|
| | 0.3 rpm | 30 rpm |
| +20 | 6000 | 480 |
| 0 | 8000 | 820 |
| −10 | 10,600 | 1150 |

EXAMPLE 4

A type II aircraft deicing liquid having the following composition was prepared in accordance with the procedure below:

50.00% by weight of 1,2-propylene glycol 0.25% by weight of crosslinked acrylic acid copolymer having a mean molecular weight of around 1,000,000 which contains, in copolymerized form, 2 mol-% of dodecyl methacrylate as comonomer, molar percentages being based on the overall polymer. The polymer has a viscosity of 8000 mPa·s in a 0.5% strength by weight aqueous solution having a pH of 7.0 (adjusted with NaOH), measured with a Brookfield viscometer at 20 rpm and 20° C.

0.10% by weight of fatty alcohol ethoxylate of a C$_{16}$ alcohol and 7 mol of ethylene oxide 0.08% by weight of sodium dihydrogen phosphate 0.05% by weight of benzotriazole remainder: water to 100% by weight.

Preparation is as described in Example 1.

The resulting deicing liquid is tested for viscosity and holdover time. The results are compiled below:

holdover time (in accordance with the water spray endurance test at −5° C.): 58 minutes viscosity at +20° C. 0° C. and −10° C. in each case at 0.3 rpm (0.084 s$^{-1}$ shear rate) and 30 rpm (8.4 s$^{-1}$):

| Temperature [°C.] | Viscosity [mPa · s] | |
|---|---|---|
| | 0.3 rpm | 30 rpm |
| +20 | 6200 | 600 |
| 0 | 8000 | 750 |
| −10 | 6600 | 710 |

We claim:

1. A polymer-thickened deicing or anti-icing composition, consisting essentially of
   a) from 35 to 70% by weight of at least one alkylene glycol having 2 to 3 carbon atoms or oxalkylene glycol having 4 to 6 carbon atoms, or a mixture thereof,
   b) from 0.05 to 1.5% by weight of a water-soluble crosslinked homopolymer of acrylic acid or methacrylic acid, or a mixture of a water-soluble crosslinked homopolymer of acrylic acid and a water-soluble crosslinked homopolymer of methacrylic acid, said homopolymer and said mixture each having a mean molecular weight of from 750,000 to 1,250,000 and a viscosity of from 1000 to 13,000 mPa·s, said viscosity being measured with a Brookfield viscometer at 20 rpm on a 0.5% strength by weight aqueous solution with a pH of 7.0 and a temperature of 20° C.,
   c) from 0.02 to 1.5% by weight of at least one nonionic surfactant comprising an alcohol alkoxylate having 1 to 10 C$_2$–C$_3$-alkylene oxide units, the alcohol radical of said alcohol alkoxylate having 6 to 22 carbon atoms,
   d) from 0.03 to 1% by weight of at least one water-soluble salt of an inorganic acid or aromatic or aliphatic carboxylic acid or a mixture thereof, the inorganic acid being boric, hydrohalic, silicic, phosphoric, phosphorous, sulfuric, or nitric,
   e) from 0.01 to 1% by weight of a corrosion-inhibiting, substituted or unsubstituted imidazole or triazole or a mixture thereof, and
   f) water as remainder to 100% by weight,
   percentages by weight being based on the composition.

2. A composition as claimed in claim 1, wherein, in said component b), said viscosity ranges from 2000 to 7000 mPa·s.

3. A composition as claimed in claim 1, whereto said component c) comprises a fatty alcohol alkoxylate having 8 to 18 carbon atoms in the fatty alcohol radical and having 1 to 5 ethylene oxide units or propylene oxide units.

4. A composition as claimed in claim 3, wherein said fatty alcohol alkoxylate has 1 to 5 ethylene oxide units.

5. A composition as claimed in claim 1, wherein, in said component d), said water-soluble salt is a salt of an inorganic acid or a mixture of salts of inorganic acids.

6. A composition as claimed in claim 1, wherein, in said component d), said water-soluble salt is a salt of a C$_1$–C$_3$-monocarboxylic acid, dicarboxylic acid, hydroxycarboxylic acid or benzoic acid.

7. A composition as claimed in claim 1, wherein component d) is at least one water-soluble alkali metal salt of boric acid, phosphoric acid, phosphorous acid, sulfuric acid, nitric acid, formic acid, acetic acid, oxalic acid, lactic acid, or citric acid.

8. A composition as claimed in claim 1, which consists essentially of components a) to f) in the following amounts:
   a) from 40 to 60% by weight,
   b) from 0.1 to 1% by weight,
   c) from 0.05 to 1% by weight,
   d) from 0.05 to 0.4% by weight,
   e) from 0.03 to 0.7% by weight, and
   f) water as remainder to 100% by weight.

9. A composition as claimed in claim 1, consisting essentially of
   a) from 35 to 70% by weight of propylene glycol,
   b) from 0.05 to 1.5% by weight of a said component b), wherein said viscosity ranges from 2000 to 7000 mPa·s,
   c) from 0.02 to 1.5% by weight of a fatty alcohol ethoxylate having 8 to 18 carbon atoms in the fatty alcohol radical and having 1 to 5 ethylene oxide units,
   d) from 0.03 to 1% by weight of a water-soluble alkali metal salt of boric acid, phosphoric acid, phosphorous acid, sulfuric acid, nitric acid, formic acid, acetic acid, oxalic acid, lactic acid or citric acid,
   e) from 0.01 to 1% by weight of benzotriazole or tolyltriazole, and
   f) water as reminder to 100% by weight.

10. A composition as claimed in claim 9, which consists essentially of components a) to f) in the following amounts:
    a) from 40 to 60% by weight,
    b) from 0.1 to 1% by weight,
    c) from 0.05 to 1% by weight,
    d) from 0.05 to 0.4% by weight,
    e) from 0.03 to 0.7% by weight, and
    f) water as remainder to 100% by weight.

11. A method for deicing an aircraft or for preventing the deposits of ice, snow, or hoar frost on a surface of an aircraft comprising the step of applying the composition of claim 1 to said surface.

* * * * *